(12) United States Patent
Poletto

(10) Patent No.: US 6,657,575 B2
(45) Date of Patent: Dec. 2, 2003

(54) DIGITAL CONTROL CIRCUIT OF THE PROPORTIONAL INTEGRAL TYPE

(75) Inventor: Vanni Poletto, Casale Monferrato (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/033,697

(22) Filed: Dec. 27, 2001

(65) Prior Publication Data

US 2002/0167431 A1 Nov. 14, 2002

(30) Foreign Application Priority Data

Dec. 29, 2000 (EP) .............................................. 00830872

(51) Int. Cl.[7] ..................... H03M 1/34; G05B 11/42
(52) U.S. Cl. .............................. 341/164; 318/610
(58) Field of Search ......................... 341/155, 164, 341/166, 200, 157, 131; 323/283; 363/41, 71; 318/802, 293, 608, 609, 610; 324/772; 331/1 A; 375/222; 348/537

(56) References Cited

U.S. PATENT DOCUMENTS

| | | | |
|---|---|---|---|
| 2,836,356 A | | 5/1958 | Forrest et al. ............... 341/164 |
| 4,095,165 A | * | 6/1978 | Boros ......................... 323/283 |
| 4,109,194 A | * | 8/1978 | Miller ........................ 323/283 |
| 4,598,270 A | | 7/1986 | Shutt et al. .................. 341/166 |
| 4,630,187 A | * | 12/1986 | Henze ......................... 363/41 |
| 5,101,205 A | | 3/1992 | Yasuda ........................ 341/155 |
| 5,450,137 A | * | 9/1995 | Rickard et al. ............... 348/537 |
| 5,811,957 A | * | 9/1998 | Bose et al. ................... 318/802 |
| 6,031,481 A | | 2/2000 | Craven ........................ 341/200 |
| 6,127,960 A | * | 10/2000 | Silver et al. ................. 341/157 |

FOREIGN PATENT DOCUMENTS

| | | |
|---|---|---|
| WO | WO 99/67885 | 12/1999 |
| WO | WO 00/38327 | 6/2000 |

OTHER PUBLICATIONS

European Search Report dated May 8, 2002 for European Patent Appln. No. 01130837.

* cited by examiner

Primary Examiner—Patrick Wamsley
(74) Attorney, Agent, or Firm—Lisa K. Jorgenson; Jon A. Gibbons; Fleit, Kain, Gibbons, Gutman, Bongini & Bianco P.L.

(57) ABSTRACT

The present invention relates to a digital control circuit of the P.I. (Proportional Integral) type, receiving an error signal (Error) at an input terminal (IN1) and adapted to provide, at an output terminal (OUT1), a PWM [Pulse Width Modulated] output signal (PWM Output). The circuit is of a type comprising at least one analog-to-digital converter (100, 100*) connected to the input terminal (IN) and to the output terminal (OUT1) through at least one integrative/proportional branch (120, 121, 130, 134). Advantageously in this invention, the analog-to-digital converter (100, 100*) is an integration converter adapted to integrate the error signal (Error) before an analog-to-digital conversion thereof.

18 Claims, 11 Drawing Sheets

DIGITAL CONTROL CIRCUIT OF THE PROPORTIONAL INTEGRAL TYPE

CROSS-REFERENCE TO RELATED APPLICATIONS

This application is based upon and claims priority from prior European Patent Application No. 00830872.8, filed on Dec. 29, 2000, the entire disclosure of which is herein incorporated by reference.

BACKGROUND OF THE INVENTION

1. Field of the Invention

The present invention relates to a digital control circuit of the proportional integral type.

Specifically, the invention relates to a digital control circuit of the P.I. (Proportional Integral) type, receiving an error signal at an input terminal and adapted to provide, at an output terminal, a PWM (Pulse Width Modulated) output signal, the circuit being of a type which comprises at least one analog-to-digital converter connected to said input terminal and to said output terminal through at least one integrative/proportional branch.

The invention relates, particularly but not exclusively, to a system for controlling a current in an inductive load, and this description covers this field of application for convenience of explanation only.

2. Description of the Related Art

As it is well known, there are a large number of applications where a current flowing through a load requires to be measured and controlled.

As an example, FIG. 1 shows schematically a conventional control system for controlling a current in an inductive load generally designated 10. In particular, the control system 10 includes an inductive load 11, which is connected between a first voltage reference, specifically a battery supply voltage $V_{BAT}$, and an internal control node $X_{C1}$ of the control system 10. A current $I_{OUT1}$ flows through the inductive load 11 and requires to be measured. The control system 10 applies for this purpose a control of the PWM (Pulse Width Modulation) type, wherein only the feedback current of the load 11 is sensed by a first or sensing resistive element $R_{S1}$ connected between the battery supply voltage reference $V_{BAT}$ and the control node $X_{C1}$.

In particular, the first or sensing resistive element $R_{S1}$ has a first terminal connected to said battery supply voltage reference $V_{BAT}$ and to a first input terminal of an error amplifier 12, and has a second terminal connected to said control node $X_{C1}$, through a so-called free-wheeling diode $D_{FW}$, and to a second supply voltage reference, specifically a ground voltage GND, through a series of a second or reference resistive element $R_{F1}$ and a generator $G_{REF1}$, generating a reference current $I_{REF1}$.

The second or reference resistive element $R_{F1}$ has a first terminal connected to the second terminal of the first or sensing resistive element $R_{S1}$, and a second terminal connected to a second input terminal of the error amplifier 12. The error amplifier 12 also has an output terminal connected to a control circuit 13, in turn connected to a PWM drive element 14 that is connected between the control node $X_{C1}$ and ground GND. In the embodiment of FIG. 1, the PWM drive element 14 comprises a MOS transistor.

The control system 10 uses said PWM drive element 14 to force the load current $I_{OUT1}$ to a value that is proportional to the reference current $I_{REF1}$ from the generator $G_{REF1}$. In particular, when $R_{F1}=1000*R_{S1}$, it is:

$$I_{OUT1}=1000*I_{REF1}.$$

FIG. 2 shows schematically a modification of the control system 10, which still applies a PWM type of control but involves measuring the whole load current.

In particular, FIG. 2 shows a control system 20, which includes an inductive load 21 connected between a first voltage reference, e.g. a battery supply voltage $V_{BAT}$, through a first or sensing resistive element $R_{S2}$, and a control node $X_{C2}$. A current $I_{OUT2}$ is circulated through the inductive load 21 whose full value is to be monitored and measured by means of the first or sensing resistive element $R_{S2}$.

The first or sensing resistive element $R_{S2}$ has a first terminal connected to said battery supply voltage reference $V_{BAT}$, and to a second or supply voltage reference, specifically to ground GND, through a series of a second or reference resistive element $R_{REF2}$ and a generator $G_{REF2}$, generating a reference current $I_{REF}$, and has a second terminal connected to said inductive load 21 and a first input terminal of an error amplifier 22.

Also, the interconnect point of the second or reference resistive element $R_{REF2}$ and the generator $G_{REF2}$ is connected to a second input terminal of the error amplifier 22.

The error amplifier 22 also has an output terminal connected to a control circuit 23, itself connected to a PWM drive element 24 that is connected between the control node $X_{C2}$ and ground GND.

With the control system 20, and again when $R_{REF2}=1000*R_{S2}$, the value of the output current $I_{OUT2}$ is tied to that of the reference current $I_{REF2}$ as:

$$I_{OUT2}=1000*I_{REF2}.$$

A further modification of the control system may be provided, which would still be based on a PWM type of control but use a measurement of the load voltage as shown schematically in FIG. 3.

In particular, FIG. 3 shows a control system 30 that includes an inductive load 31, connected between a control node $X_{C3}$ and ground GND.

The control node $X_{C3}$ is connected directly to a first input terminal of an error amplifier 32, which amplifier has a second input terminal connected to an internal voltage reference $V_{REF3}$, and has an output terminal connected to a control circuit 33.

The control circuit 33 is in turn connected to the load 31 through a series of a PWM drive element 34 and an LC filter 35.

It should be noted that all of the prior applications shown schematically in FIGS. 1 to 3 employ a control circuit that is connected to a PWM load drive element to control a current of an inductive load.

Also known is to use control circuits operated by the P.I.D. (Proportional Integral Differential) method. These circuits are uniquely simple and effectual as concerns accuracy and speed of response.

FIG. 4 shows schematically a P.I. (Proportional Integral) type of control circuit 40, followed by PWM conversion (for compatibility), which circuit affords good control of a current circulated through an inductive load.

In particular, the control circuit 40 has an input terminal IN4 that is connected to a first or proportional block 42 and a second or integrator block 41, adapted for integration by a first coefficient Kp of proportionality and a second coefficient Ki of integration, in turn connected with their outputs to a summing node $X_{S41}$.

The control circuit 40 includes a subtracting node $X_{S42}$ connected (as positive addend) to the input of said summing node $X_{S41}$ and (as negative addend) to an oscillator block 43, which block generates a ramp signal effective to cause said subtracting node $X_{S42}$ to output a PWM signal.

The control circuit 40 further includes an output comparator 44, which is connected between said subtracting node $X_{S42}$ and an output terminal OUT4 of the control circuit 40. In particular, the comparator 44 is a zero crossing type and outputs a logic high signal when the input is positive and a logic low signal when the input is negative.

FIG. 5 shows schematically waveforms of the most important variables in the PWM driven control circuit 40.

In particular, FIG. 5 shows a plot of a first output signal PI_output from said summing node $X_{S41}$, taken to be constant for simplicity. This signal PI_output is compared with the signal generated by the oscillator block 43 at a frequency of 4 kHz.

The outcome of the comparison is a voltage signal Load Voltage for application to the load, also at a frequency of 4 kHz and with a duty cycle that will depend on the level of the signal PI_output with respect to the signal waveform. The signal Load Voltage is then filtered by the inductive load to emerge as a current signal Load Current that is substantially constant, as shown in FIG. 5 by way of example with an average level of 1 A and a ripple amplitude of 50 mA.

The control circuit 40 may be realized analogically, in a conventional manner as shown schematically in FIG. 6, where it is denoted generally by the reference numeral 60.

The analog embodiment 60 has an input terminal IN6 connected, through a first resistive element R61, to a first or inverting (−) input terminal of a first operational amplifier 61; the amplifier 61 also has a second or non-inverting (+) input terminal connected to ground GND, and has an output terminal connected, through a Sample&Hold circuit 62, to a first or inverting (−) input terminal of a second comparator 63, which comparator has a second or non-inverting (+) input terminal connected to an oscillator 64, and has an output terminal connected to the output terminal OUT6 of the control circuit.

In particular, the second comparator 63 outputs a logic high signal when a signal is presented to the non-inverting input (+) which is higher in value than the signal to the inverting (−) terminal.

Moreover, by introducing the Sample&Hold circuit 62, the comparator 43 is enabled to operate in the optimum conditions.

The analog embodiment 60 as shown further comprises a series of a second resistive element R62 and a capacitor C6, which are feedback connected between the output terminal and the first or inverting (−) input terminal of the operational amplifier 61.

This analog embodiment 60 of the control circuit 40 has some shortcomings originating essentially from that not all of its components can be integrated. For instance, the capacitor C6 is usually too large for integration. Also, changing the integration coefficients of the control circuit for adjustment of the control action to suit different working conditions is difficult.

From a simulation of the control system 20 shown in FIG. 2, and using an analog type of control circuit as shown in FIG. 6, it has been found that set point response does meet the speed and accuracy requisite of a final application that may be an ABS type of brake control system for an automobile vehicle (as shown schematically in FIG. 7).

The control circuit 40 may also be fully digitalized, as shown schematically at 80 in FIG. 8.

The digital embodiment 80 of the control circuit 40 has an input terminal IN8, which is input an analog error variable Error (an mA current signal); this signal is converted through an analog-to-digital converter 81 and sent, through a filter 82, to a first summing node $X_{S81}$ and to a first proportional block 85 with a first coefficient of proportionality equal to $2^{-7}$.

In particular, the analog-to-digital converter 81 is an 8-bit converter having a sampling frequency of 1 MHz and operative to convert the input error variable Error whose least significant bit represents a current of 5 mA.

Furthermore, the filter 82 calculates an average value over 250 μs, with sampling at 4 kHz and holding for 250 μs as shown schematically in FIG. 9A, where the FTR (Filter Time Response) of filter 82 for an output variable PWM Output of the PWM type provided by the digital embodiment 80 of a conventional control circuit, and a load current Load Current, are plotted against time. Shown schematically in FIG. 9B is a plot of the FFR (Filter Frequency Response) of filter 82, i.e. of the absolute value of a ratio sin(x)/x, where x is πf/4 kHz and f is the frequency.

Thus, a 16-bit word WORD is obtained at a rate of 4 kHz, with the filter 82 containing a DC component amplification factor 256.

The first summing node $X_{S81}$ is also connected, through a 19-bit storage register 83 at 4 kHz having an output terminal feedback connected to said first summing node $X_{S81}$, to a second or integrator block 84 that has a second coefficient Ki of integration $2^{-10}$.

These first or proportional and second or integrator blocks 85 and 84 are connected to a second summing node $X_{S82}$ that outputs a 19-bit string WORD STREAM of words at 4 kHz, the string being sent to a subtracting node $X_{S83}$ as a positive addend. The subtracting node $X_{S83}$ also receives an output signal from an 8-bit counter 86, also known as the OVERFLOW COUNTER, as a negative addend.

In this way, only the most significant eight bit of the word string WORD STREAM are compared with the contents of the counter 86 to output a signal Output PWM at an output terminal OUT8.

FIG. 10 shows the result of a simulation of the control system 20 as shown in FIG. 2 providing a digital control as shown in FIG. 8. The simulated current set point response meets the speed and accuracy requirements.

While being advantageous on several counts, these prior solutions have a major drawback in that they are complicated in either the analog or the digital form.

The underlying technical problem of this invention is to provide a control circuit with structural and functional features adequate to overcome the limitations of prior circuits.

SUMMARY OF THE INVENTION

The principle on which this invention stands is one of having the analog-to-digital conversion and integration operations performed by a single element, so as to simplify the whole control circuit and improve its efficiency.

Based on this principle, the technical problem is solved by a circuit as previously indicated, and as defined in the characterizing part of claim 1.

The features and advantages of a control circuit according to the invention will be apparent from the following detailed description of embodiments thereof, given by way of non-limitative examples with reference to the accompanying drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be apparent from the following detailed description taken in conjunction with the accompanying drawings.

DESCRIPTION OF THE PREFERRED EMBODIMENTS

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Figure 11:
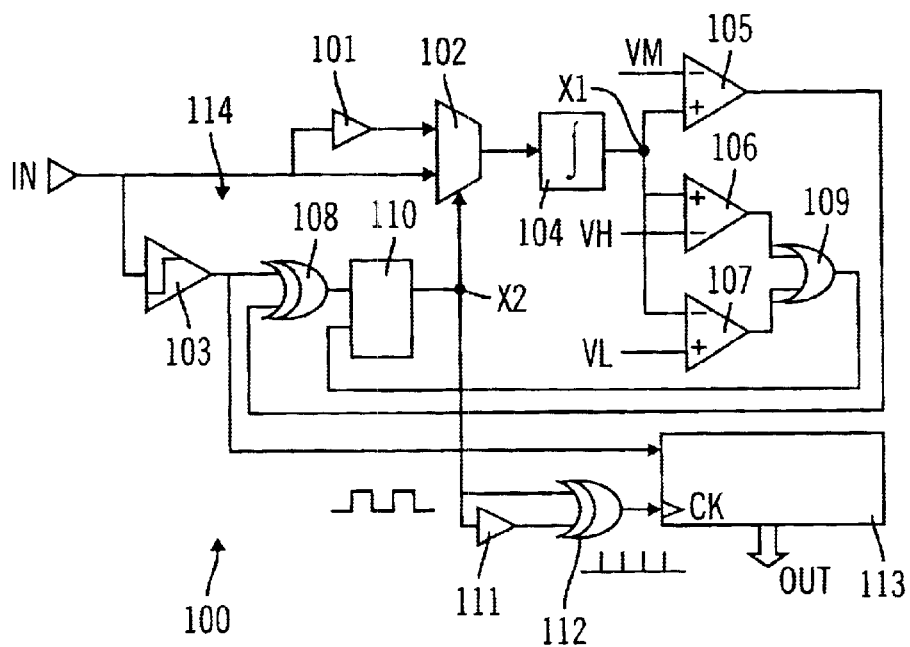
FIG. 11 shows schematically an exact integration type of A/D converter according to the invention.

With reference in particular to FIG. 11 of the drawings, an exact integration A/D (Analog-to-Digital) converter, adapted for use in a control circuit according to this invention, is shown generally at 100 in schematic form.

The exact integration A/D converter 100 has an input terminal IN connected, directly and through an inverting buffer 101, to first and second input terminals of a multiplexer 102 and to a first input comparator 103.

Moreover, the multiplexer 102 has an output terminal connected to an analog integrator block 104, itself having an output terminal X1 connected to respective first or non-inverting (+) input terminals of second and third output comparators 105 and 106 and to a first or inverting (−) input terminal of a fourth output comparator 107.

An integrated signal Int Out is at the output terminal X1 of the analog integrator block 104.

The second output comparator 105 has a second or inverting (−) input terminal connected to a first voltage reference or medium level VM, and has an output terminal connected to a first input terminal of a first logic gate 108 of the XOR type, which gate has a second input terminal connected to the first input comparator 103.

Likewise the third output comparator 106 has a second or inverting (−) input terminal connected to a second voltage reference or high level VH, and has an output terminal connected to a second logic gate 109 of the OR type. The fourth output comparator 107 has a second or inverting (−) input terminal connected to a third or low level voltage reference VL, and has an output terminal connected to the second logic gate 109, in turn connected to a first input terminal of a latch register 110 whose second input terminal is connected to the first logic gate 108.

Moreover, the latch register 110 has an output terminal X2, whereat a routing logic signal Dir is, and is connected to the multiplexer 102 as well as to first and second input terminals of a third logic gate 112 of the XOR type, directly and through a delay buffer 111, the gate 112 having an output terminal connected to a clock terminal CK of a counter 113.

The counter 113 has an input terminal connected to the second input terminal of the first logic gate 108, and has an output terminal connected to an output terminal OUT of the exact integration A/D converter 100.

The operation of the exact integration A/D converter 100 according to the invention will now be explained in relation to internal signals thereof as plotted schematically in FIG. 12.

Figure 12:
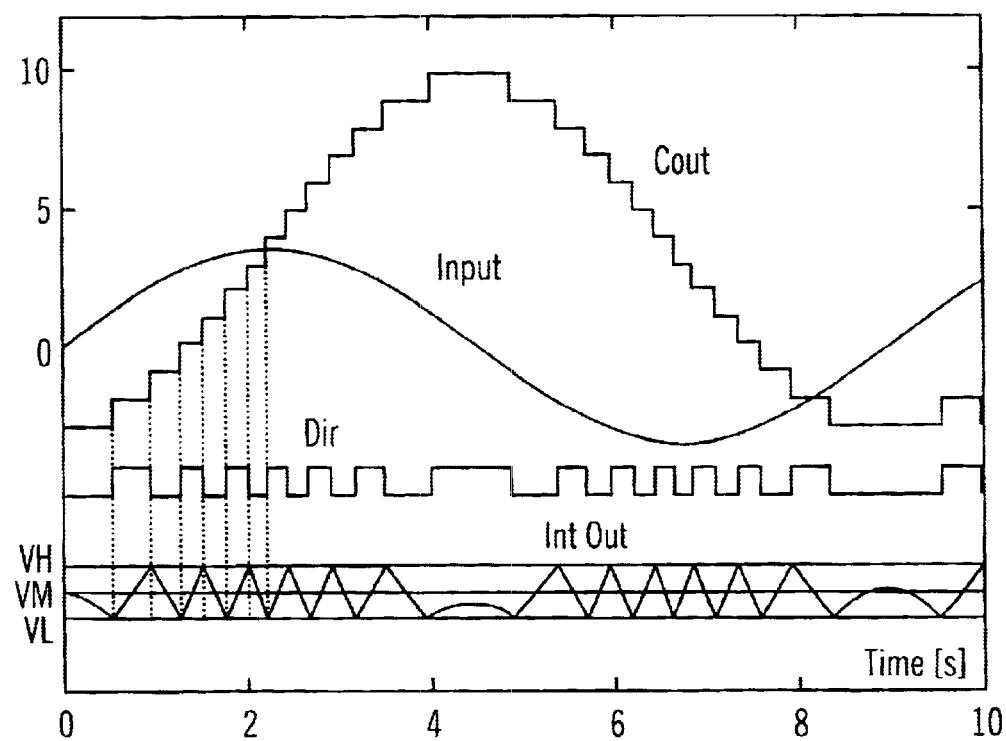
FIG. 12 shows schematically plots of internal signals of the converter of FIG. 11.

In particular, FIG. 12 shows an input signal Input of the sinusoidal type. This input signal Input is applied to the input terminal IN of the exact integration A/D converter 100 and sent to the analog integrator block 104 with an output dynamic range between the high VH and low VL levels.

When the integrated signal Int Out at the output terminal X1 of the analog integrator block 104 goes down to the low level VL, a sign change is performed at the input of the integrator block 104, whereby its output terminal X1 reverses its direction and begins to go up.

On the other hand, when the output terminal X1 of the integrator block 104 climbs up to the high level VH, a sign change takes place at its input terminal whereby its output terminal X1 again reverses its direction and begins to go down.

In particular, the set of the output comparators 105, 106, 107, first logic gate 108, latch register 110, first input comparator 103, multiplexer 102, third logic gate 112, delay buffer 111, and integrator block 104 form a feedback loop 114 inside the exact integration A/D converter 100.

In this way, the output terminal X1 of the integrator block 104 can be kept within a predetermined dynamic range by suitable selection of the high and low levels VH and VL.

Furthermore, every time that the sign at the input terminal of the integrator block 104 is changed, this is accounted for by an up or down count in the counter 113 and by an increased or decreased counter output signal Cout being at the output terminal OUT of the exact integration A/D converter 100, according to whether the value on the terminal IN is positive or negative.

Thus, the set of the analog integrator block 104 and counter 113 contains complete information about the integral of the input signal Input, which information can be re-constructed any time by suitably combining the two corresponding outputs.

The output signal Cout from the counter 113 can be regarded as the most significant part of the integral, with the integrator output Int Out being the least significant part, as shown schematically in FIG. 12, where the sign signal Dir is also shown. Thus, the output signal Cout from the counter 113 corresponds to the integral of the input signal Input in digital form, meaning that the exact integration A/D converter 100 performs an analog integration operation followed by a digital conversion operation.

In particular, the analog integrator block 104 is connected either to the input signal Input or, through the inverting buffer 101, to the value of this signal with its sign inverted, according to the value taken by the routing logic signal Dir.

The integrated signal Int Out at the output terminal X1 of the integrator block 104 is monitored by the comparators 106 and 107, which comparators sense the moment this signal reaches, and tends to go beyond, the low and high levels VL and VH, respectively.

Upon either occurrences, the OR logic gate 109 controls the latch register 110 to become transparent, and the routing signal Dir is updated by a signal output to the first logic gate 108, which gate will exclusive-or both the sign of the input signal Input generated by the first input comparator 103 and the sign of the integrated signal Int Out generated by the first output comparator 105.

The first output comparator 105 compares the integrated signal Int Out with a level VM, intermediate the low level VL and the high level VH, usually equal to zero.

The feedback loop 114 holds the integrated signal Int Out in between the low level VL and the high level VH because, as it tends to go outside either of these levels, the routing logic signal Dir is updated in conformity with the following rule:

when the signs of the input signal Input and the integrated signal Int Out are equal, the inverted input signal Input is integrated;

when the signs of the input signal Input and the integrated signal Int Out are not equal, the straight input signal Input is integrated.

In addition, each time that the routing logic signal Dir is changed, the counter 113 counts up or down one unit according to the sign of the input signal Input.

It should be noted that the delay buffer 111 and third logic gate 112 form a monostable circuit adapted to generate a clock pulse at each ascending or descending transition of the routing logic signal Dir.

Also, the feedback loop 114 forms an oscillator whose frequency is controlled by the level of the input signal Input, as can be derived from the pattern of the integrated signal Int Out shown in FIG. 12, where the oscillation frequency is proportional to the absolute level of the input signal Input.

Figure 13:
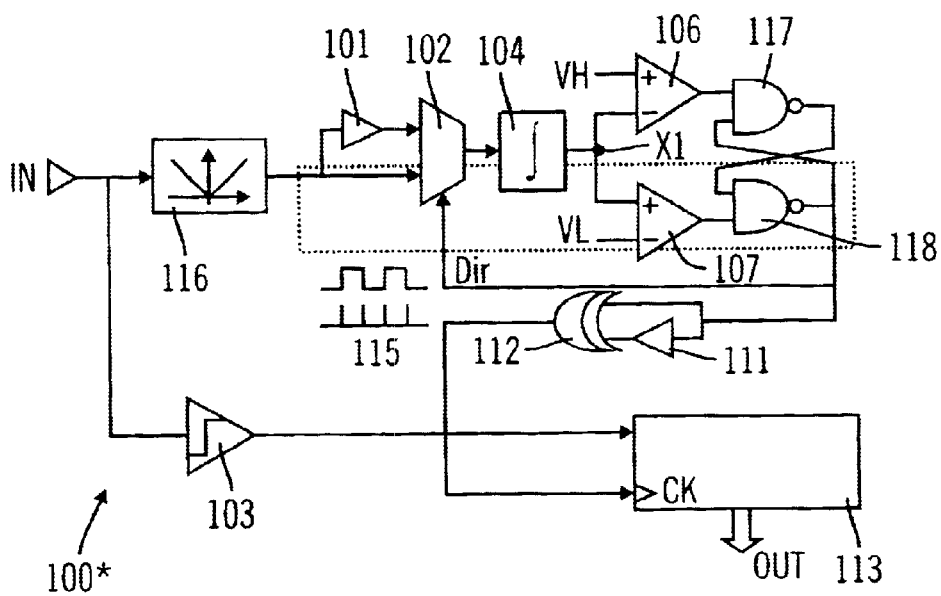
FIG. 13 shows schematically a modified embodiment of the A/D converter of FIG. 11.

The exact integration A/D converter 100 according to this invention is made even simpler where a VCO (Voltage Controlled Oscillator) 115 is used under control by the input signal Input, according to a first modified embodiment of the approximate integration A/D converter 100* according to the invention shown schematically in FIG. 13.

For simplicity, structurally and functionally identical elements with those of the exact integration A/D converter 100 are denoted by the same reference numerals.

The approximate integration A/D converter 100* has an input terminal IN connected, through a rectifier 116, to the VCO 115 and to the first input comparator 103, which comparator is connected to a first input terminal of the counter 113.

The counter 113 has a clock terminal connected to the VCO 115, and has an output terminal connected to the output terminal OUT of the approximate integration A/D converter 100*.

In particular, the VCO 115 includes a multiplexer 102 that has a first input terminal connected directly to the rectifier 116, and has a second input terminal connected to the rectifier 116 through the inverting buffer 101. The multiplexer 102 has its output terminal connected to the integrator block 104, the latter having its output terminal X1 connected to an inverting (−) input terminal of the output comparator 106, and connected to a non-inverting (+) input terminal of the output comparator 107.

The integrated signal Int Out is at the output terminal X1 of the integrator block 104.

The output comparator 106 receives the high level VH at its non-inverting (+) input terminal, and has an output terminal connected to a first input terminal of a NAND logic gate 117, having the second input terminal connected to an output terminal of another NAND logic gate 118, and an output terminal connected to an input terminal of the logic gate 118.

The output comparator 107 likewise receives the low level VL at its inverting (−) input terminal, and has an output terminal connected to a second input terminal of the logic gate 118.

The output terminal of the logic gate 118 is connected to deliver the routing logic signal Dir to the multiplexer 102, and is connected to a first input terminal of the logic gate 112, directly and through the delay buffer 111.

The input signal Input is rectified through the rectifier 116 in the approximate integration A/D converter 100* shown in FIG. 13, before being issued to control the VCO 115.

The output frequency of the VCO 115 controls the clock terminal of the counter 113. The other input terminal of the counter 113 is driven by the sign of the input signal Input as set by the first input comparator 103.

Figure 14:
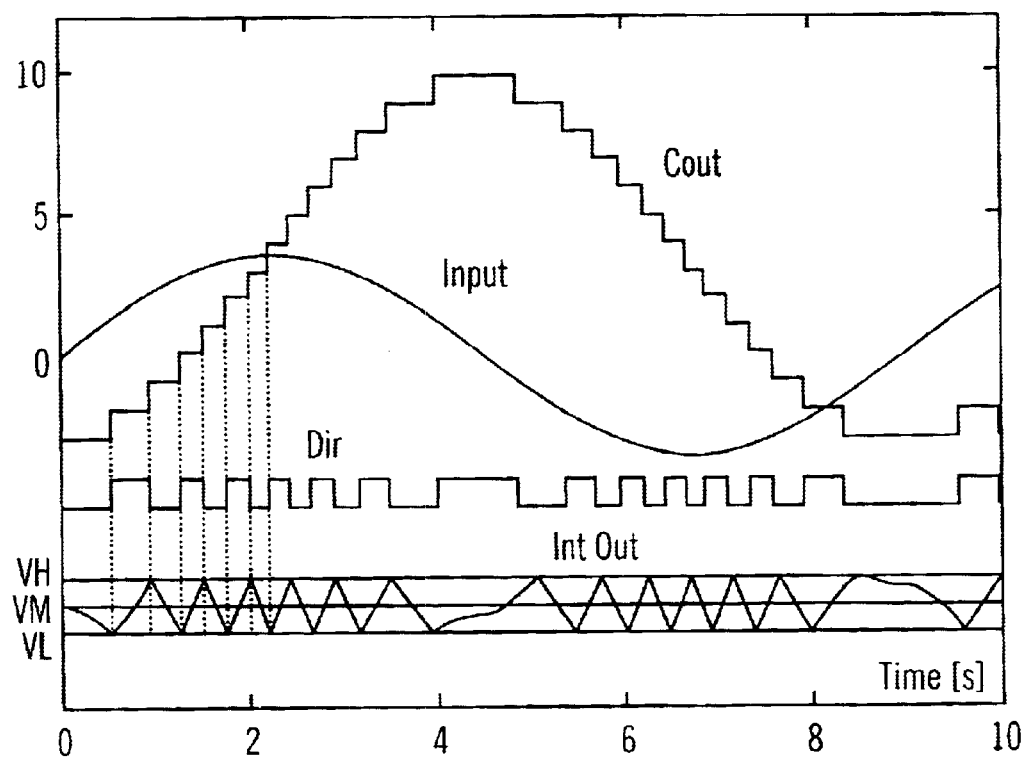
FIG. 14 shows schematically plots of internal signals of the converter of FIG. 13.

Plotted schematically in FIG. 14 are the input signal Input, integrated signal Int Out, routing logic signal Dir, and signal Cout presented on the output terminal OUT of the approximate integration A/D converter 100*.

It is readily seen that these signals follow similar patterns as the corresponding signals provided in the exact integration A/D converter 100 of FIG. 11.

Differences only show at the zero crossings of the input signal Input, and constitute the error by which the VCO 115 approximates the performance of an ideal integrator.

Figure 15:
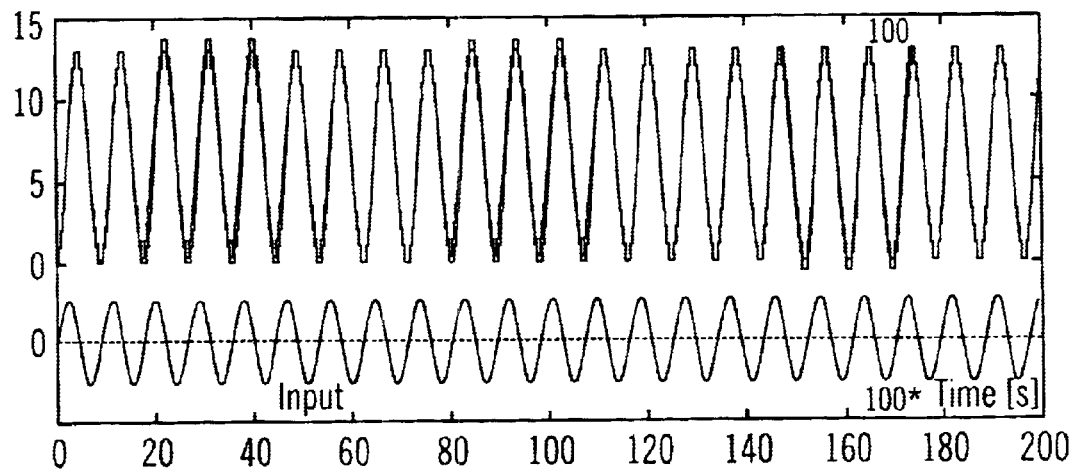
FIG. 15 shows schematically plots of internal signals of the converter of FIG. 11 and the converter of FIG. 13.

This error turns out to be zero once averaged over a large number of periods, as shown schematically in FIG. 15 where the output signal Cout from the counter 113 in the exact integration A/D converter 100 is compared with the output signal Cout from the counter 113 in the approximate integration A/D converter 100* incorporating the VCO 115, being both excited by the same input signal Input.

It should be noted that the approximate integration A/D converter 100* shown in FIG. 13 employs a relaxation VCO 115, known from the literature, which includes an integrator block 104 fairly similar in appearance to the feedback loop 114 of the exact integration A/D converter 100 in FIG. 11.

The object of this option is to facilitate comparison of the respective waveforms. In practice, however, configurations of the VCO 115 could be used which comfortably attain frequencies of tens of MHz. This is not so easily achieved with an exact integrator, which would usually need a fedback operational amplifier whose frequency band is typically limited to a few MHz. A higher oscillation frequency would afford improved resolution in time, resulting in improved accuracy.

The result of the comparison in FIG. 15 can, therefore, be considered the worst-case for the approximate solution that oscillates at the same frequency as the exact one.

Figure 1:
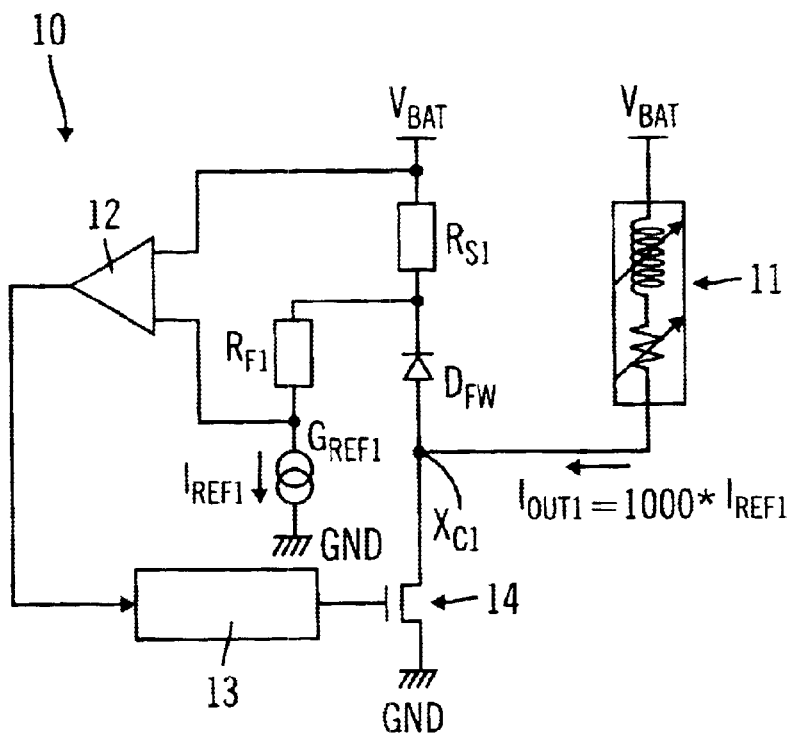
FIG. 1 shows schematically a control system for a current in an inductive load by PWM control, according to the prior art.
Figure 2:
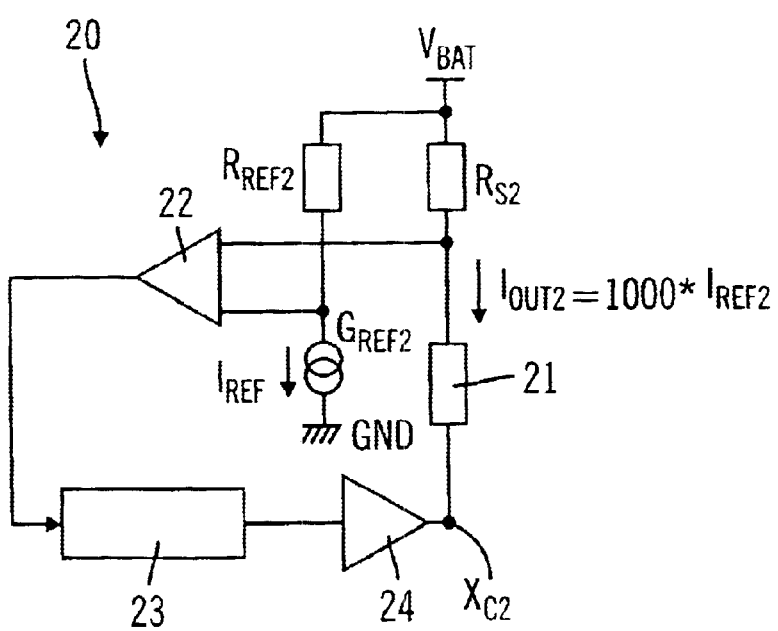
FIG. 2 shows schematically a first modified embodiment of the system of FIG. 1.
Figure 3:
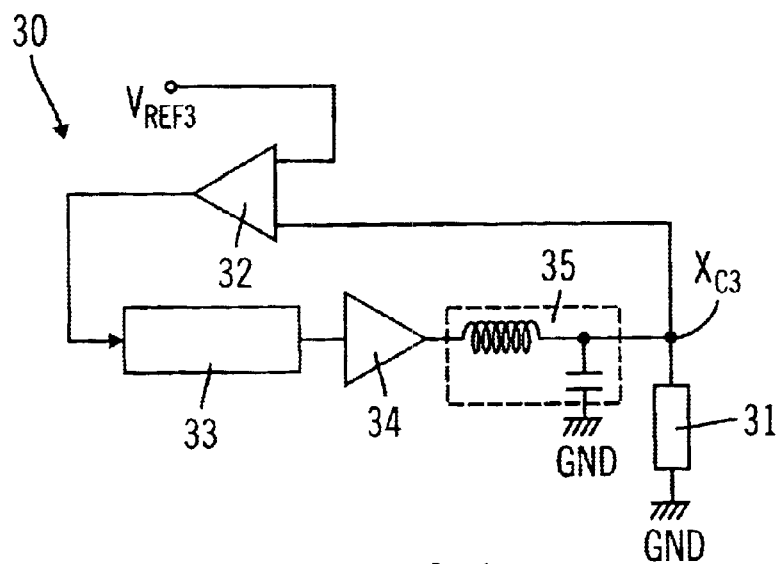
FIG. 3 shows schematically a second modified embodiment of the system of FIG. 1.
Figure 4:
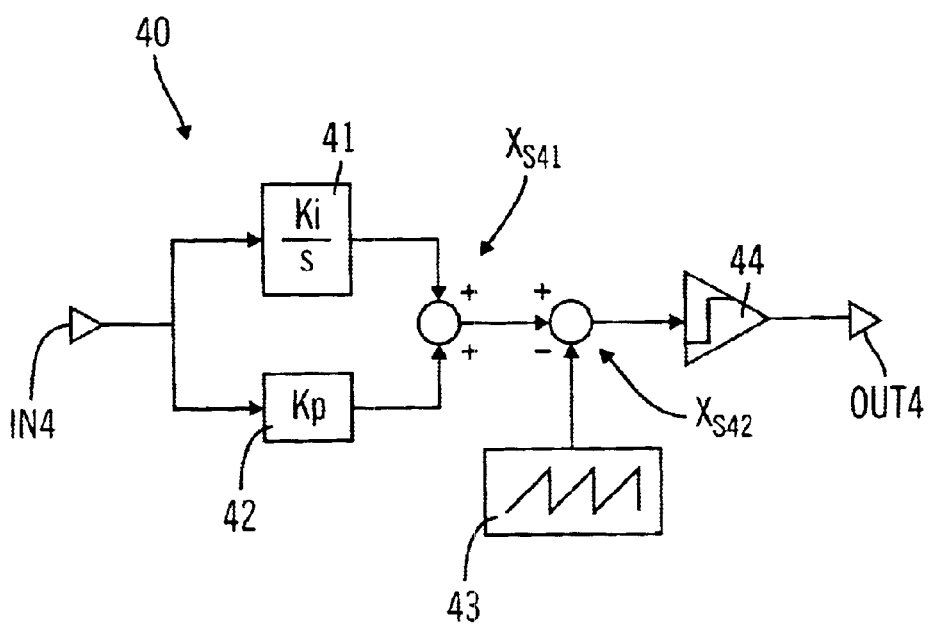
FIG. 4 shows schematically a control circuit of the P.I. (Proportional Integral) type, with a further PWM conversion, according to the prior art.
Figure 5:
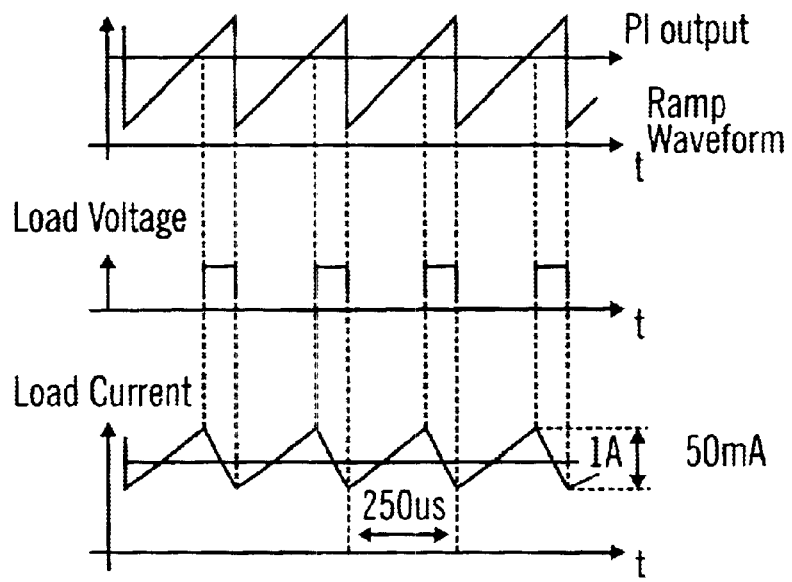
FIG. 5 shows schematically plots of internal signals of the circuit of FIG. 4.
Figure 6:
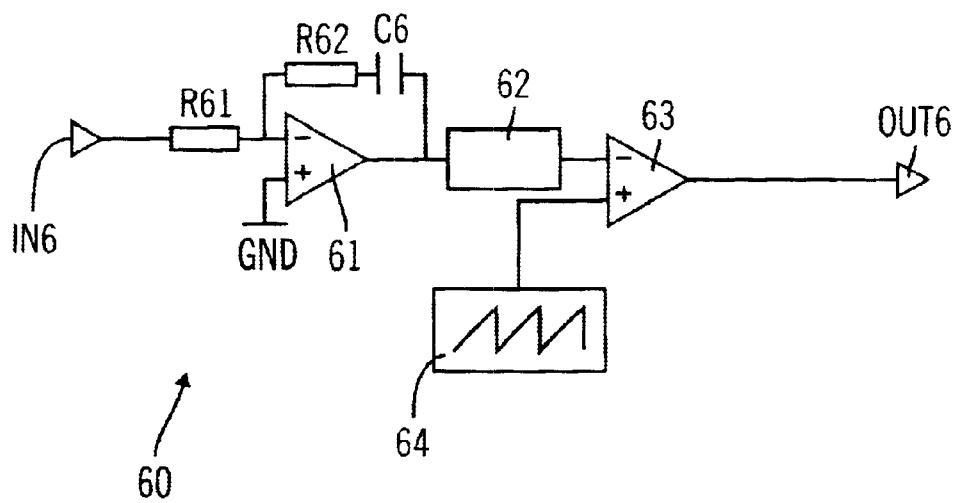
FIG. 6 shows schematically a first embodiment, of the analog type, of the circuit of FIG. 4.
Figure 7:
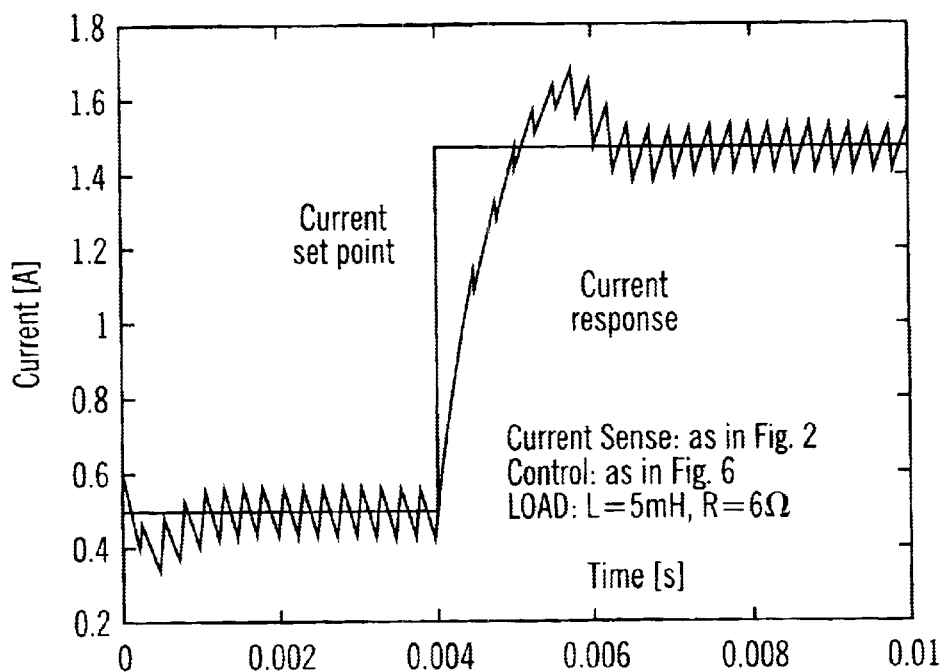
FIG. 7 shows schematically plots of internal signals of a control system for a current in an inductive load equipped as shown in FIG. 6.
Figure 8:
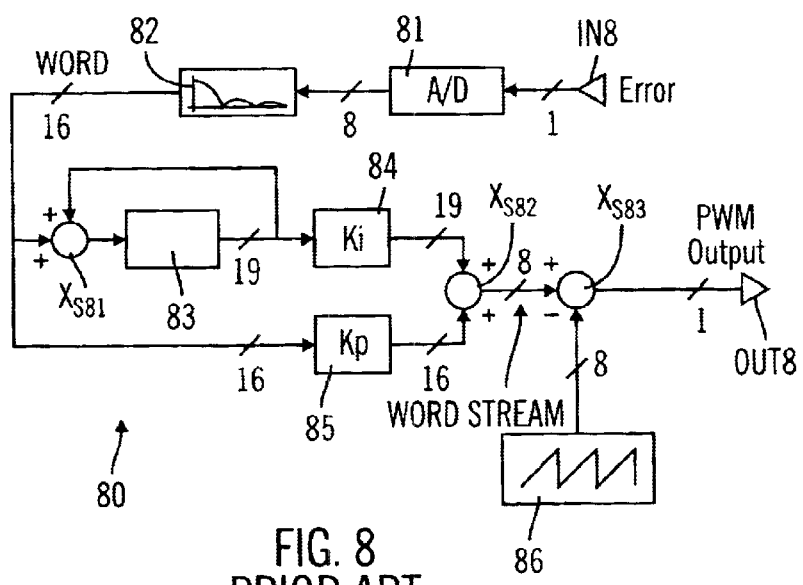
FIG. 8 shows schematically a second embodiment, of the digital type, of the circuit of FIG. 4.
Figure 9A:
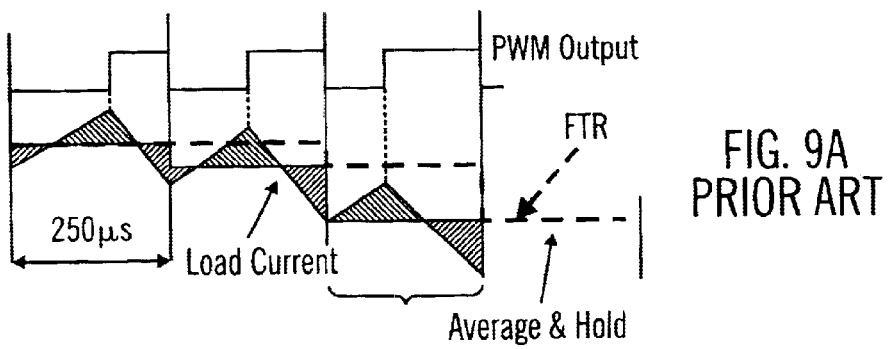
FIGS. 9A, 9B and 10 show schematically plots of internal signals of a control system for a current in an inductive load equipped as shown in FIG. 8.
Figure 9B:
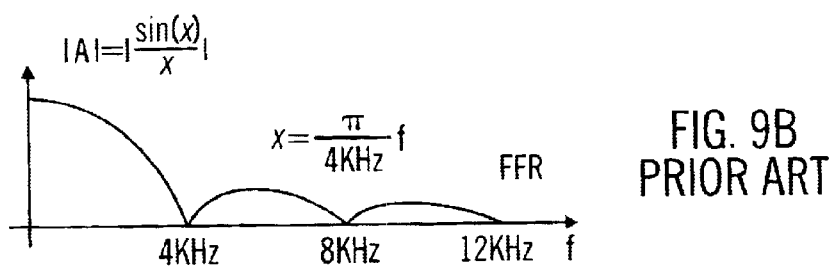
Figure 10:
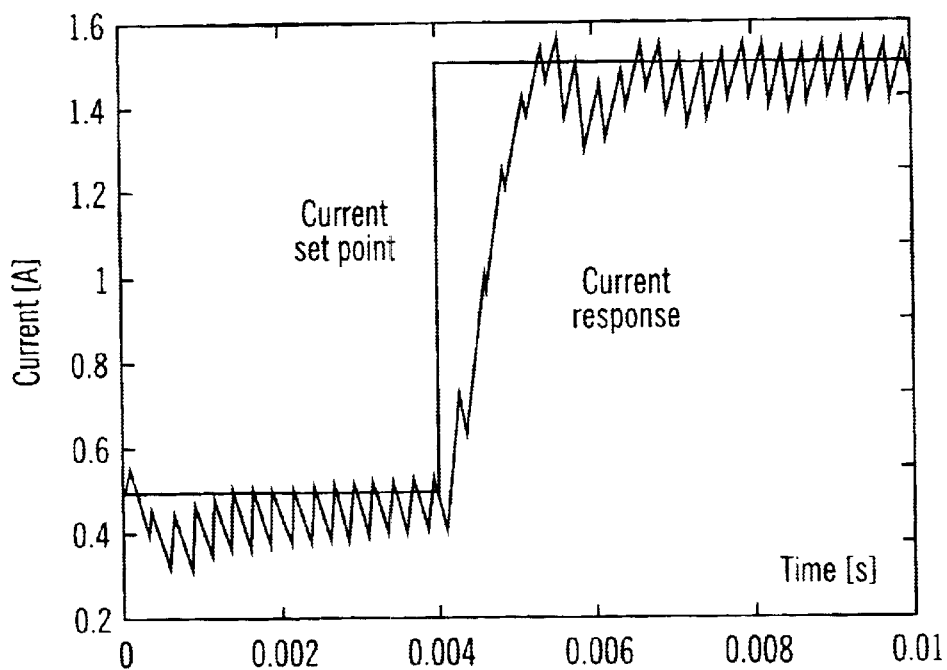
Figure 16:
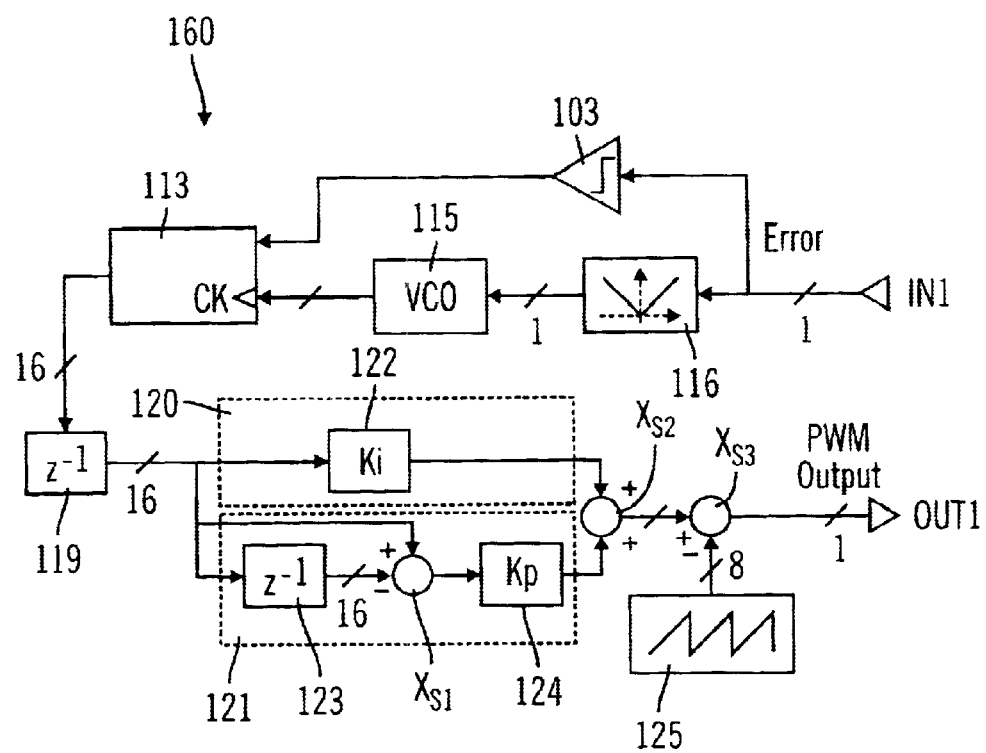
FIG. 16 shows schematically a control circuit according to the invention.

The approximate integration A/D converter 100* may enter the construction of a control circuit 160 as shown schematically in FIG. 16. Again for simplicity, structurally and functionally identical elements with those of the approximate integration A/D converter 100* of FIG. 3 are denoted by the same reference numerals.

In particular, the control circuit 160 has an input terminal IN1 arranged to receive an analog error signal Error and connected to a first input comparator 103, in turn connected to a first input terminal of a counter 113.

The input terminal IN1 is further connected to a clock terminal of the counter 113 through a series of a rectifier 116 and a VCO 115.

The counter 113 is connected to a first 4-kHz register 119 whose output is split between a first or integrative branch 120 and a second or proportional branch 121.

In particular, the first or integrative branch 120 comprises an integrator block 122 having a coefficient Ki of integration, and the second or proportional branch 121 comprises a second register 123 differentiating an information of integration of the input error signal Error, a first subtracting node $X_{S1}$, and a proportional block 124 having a coefficient Kp of proportionality.

The first or integrative branch 120 and second or proportional branch 121 have their outputs connected to a summing node $X_{S2}$, itself connected to a second subtracting node $X_{S3}$ that receives an output signal from an 8-bit counter 125, known as the overflow counter, as a negative addend.

The summing node $X_{S2}$ has its output connected to an output terminal OUT1 of the control circuit 160 whereat a PWM output signal Output is.

It should be noted that the control circuit 160 of FIG. 16 employs an I.P. type of control, and comprises an approximate integrator formed with a VCO.

The counter 113 outputs, as explained in connection with the approximate integration A/D converter 100* of FIG. 13, a 16-bit digital piece of information about the integral of the input error signal Error.

This digital piece of information is sampled at 4 kHz in the first register 119. The output from this register is apportioned to the first or integrative branch 120 and the second or proportional branch 121, and is then consolidated in the summing node $X_{S2}$.

The information output from the summing node $X_{S2}$ is converted into the PWM output signal in the second subtracting node $X_{S3}$ and the counter 125, as explained in connection with the state of the art.

Figure 17:
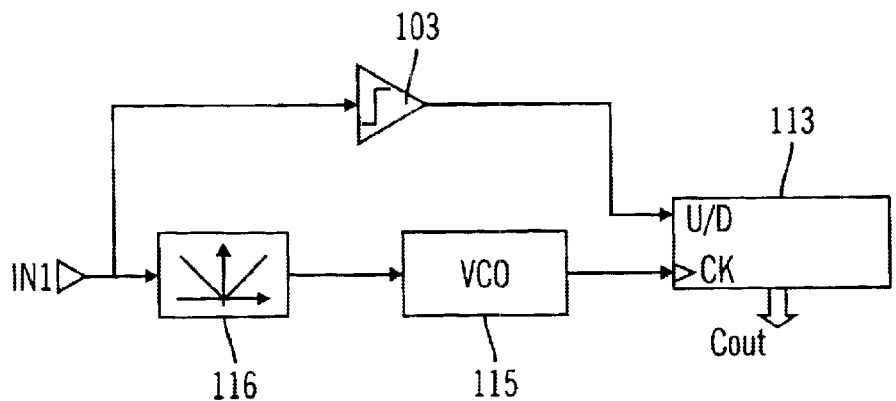
FIG. 17 is a block diagram of the circuit shown in FIG. 16.

FIG. 17 illustrates schematically the central portion of the control circuit 160 according to the invention. It can be seen in FIG. 17 that the input signal Input is rectified through the rectifier 116 before being delivered to control the VCO 115. The output from the VCO 115 is a proportional frequency to its input signal.

The output frequency of the VCO 115 controls the clock terminal CK of counter 113. Accordingly, the counter 113 will count up (or down) at a rate that is the higher, the higher in absolute value the level of the input signal Input.

The counter 113 will count up or down, depending on whether the sign of the signal Input, as sensed by the first input comparator 103, is positive or negative.

It can be appreciated that the output signal Cout from the counter 113 is nothing but the digital form of the integral of the input signal Input.

Figure 18:
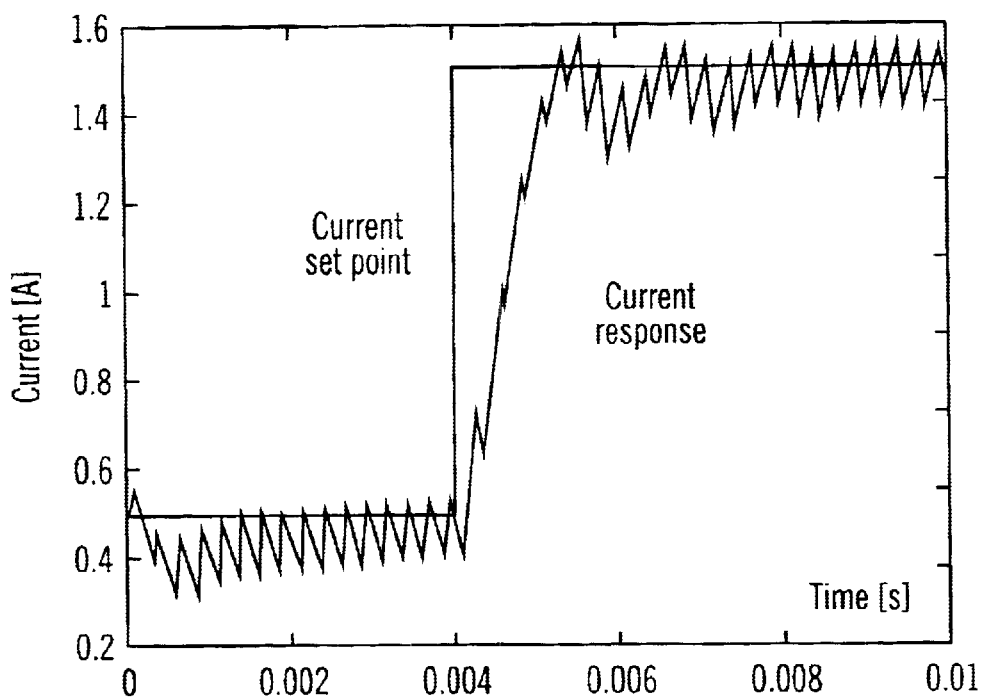
FIG. 18 shows schematically plots of internal signals of the control circuit of FIG. 16.

Shown in FIG. 18 is the result of a simulated set point response of the I.P. control circuit 160 having the VCO-based approximate integrator of FIG. 16. It is evinced that the performance of the control circuit 160 according to the invention meets the specifications of an application system, such as an automotive ABS (Anti-lock Braking System), as explained in connection with the state of the art.

Advantageously in this invention, modified embodiments of the control circuit according to the invention can be envisaged. For instance, the first register 119 could be moved downstream the summing node $X_{S2}$ that joins the first or integrative branch 120 to the second or proportional branch 121, obtaining the same performance.

Figure 19:
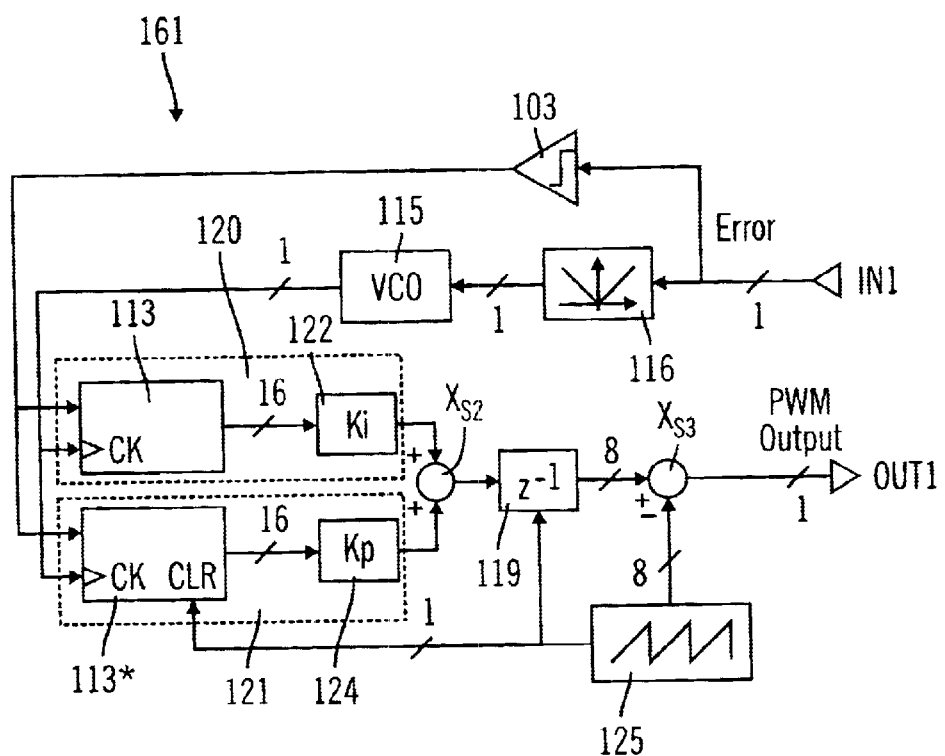
FIG. 19 shows schematically a modified embodiment of the control circuit of FIG. 16.

Another embodiment of the control circuit according to the invention is shown schematically in FIG. 19 and generally designated 161, wherein the proportional information is generated using an alternative method.

The control circuit 161 comprises first 113 and second 113* counters, having respective input (U/D) and clock (CK) terminals connected to the first input comparator 103 and the VCO 115 such that they are operated by the same count direction signal issued from the first input comparator 103, and clocked by the same clock signal issued from the VCO 115.

In particular, the first counter 113 is a part of a first or integrative branch 120 that also includes an integrator block 122, and the second counter 113* is a part of a second or proportional branch 121 that also includes a proportional block 124.

In the control circuit 161 of FIG. 19, these first or integrative branch 120 and second or proportional branch 121 are connected to a summing node $X_{S2}$ and a register 119, the latter being downstream the former and connected to a subtracting node $X_{S3}$.

Advantageously in this embodiment of the control circuit according to the invention, the second counter 113* has a reset terminal (CLK) connected to the counter 125.

Resetting is effected at a rate of 4 kHz, and allows the second counter 113* of the second or proportional branch 121 of the control circuit 161 to output a proportional piece of information that is the equivalent of that obtained by differentiating the integral information of the second or proportional branch 121 of the control circuit 160 of FIG. 16.

For the control circuit according to the invention to perform correctly, suitable expedients must be adopted to account for the fact that the circuit is operated in less-than-ideal conditions.

Figure 20:
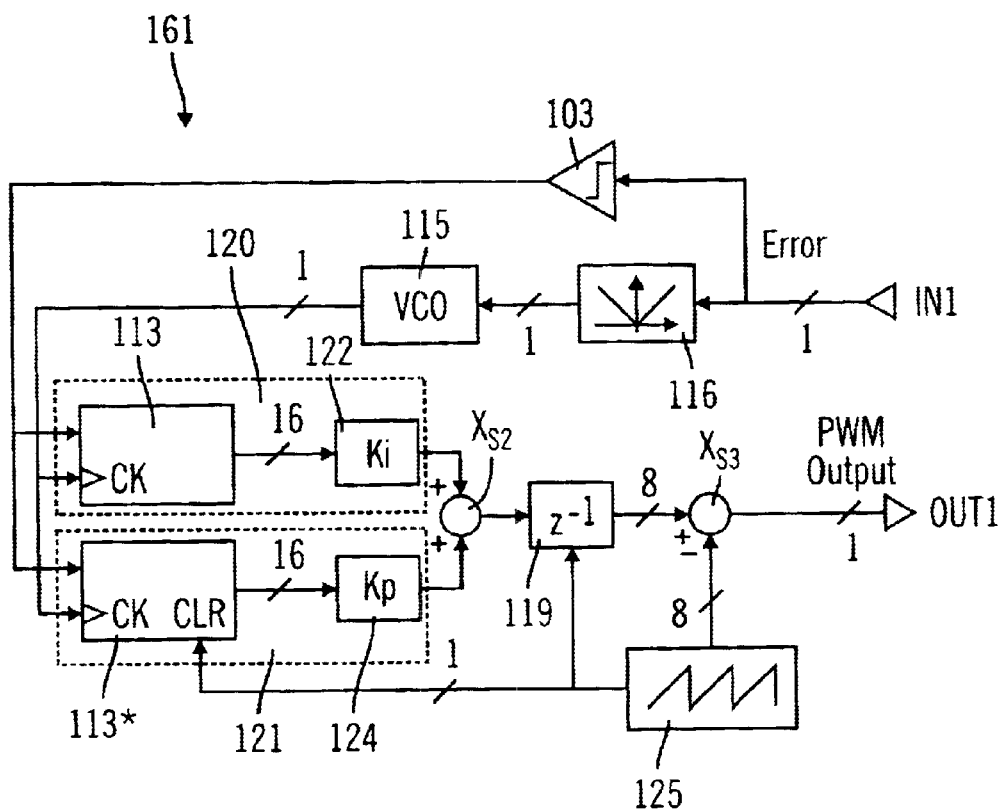
FIG. 20 shows schematically another modified embodiment of the control circuit of FIG. 16.

Thus, a control system 162 is obtained as shown schematically in FIG. 20.

The control system 162 has an input terminal IN1 connected to a first input comparator 103, in turn connected to a first input terminal of a counter 113 and to a series of a rectifier 116, limiter 126, and VCO 115.

This VCO 115 is also connected to a clock terminal CK of the first counter 113 and to a first input terminal of a latch register 127, the latter having an output terminal connected to a clock terminal CK of a buffer register 128. The register 128 has a second input terminal connected to the first counter 113, and an output terminal connected to an input terminal of a first register 129 that is connected to a first integrative/proportional branch 130 of the control system 162.

The first integrative/proportional branch 130 includes a second register 131, having an input terminal connected to an output terminal of the first register 129, and having an output terminal connected to a subtracting node $X_{S4}$ as a negative addend.

The subtracting node $X_{S4}$ receives, as a positive addend, a signal which is at the output terminal of the first register 129, and has its output connected to a first multiplication block by a first coefficient Kp/Ki, in turn connected to a summing node $X_{S5}$ that also receives the signal at the output terminal of the first register 129 as a positive addend.

The first integrative/proportional branch 130 has its output connected to a non-inverting (+) input terminal of a comparator 133, whose inverting (−) input terminal is connected to a second branch 134, and has an output terminal connected to an input terminal of an output D flip-flop 135.

The second branch 134 comprises essentially a second multiplication block 136 by a second coefficient 1/Ki, which has an input terminal connected to an output terminal of an 8-bit counter 125 known as the overflow counter. The control system 162 also comprises an OR logic gate 137 having a first input terminal connected to a generator 138 generating a clock signal CK, a second input terminal connected to a second output terminal of the counter 125, and an output terminal connected to the clock terminals of the latch register 127 and the first and second registers 129 and 131.

Finally, the clock generator 138 is connected directly to the clock terminals of the counter 125 and the output flip-flop 135, the latter being in turn connected to an output terminal OUT1 of the control system 162 whereat a PWM output signal Output is.

In the control system 162 according to the invention, a 4-kHz output clock signal from the OR logic gate 137 is made synchronous with the 1-MHz clock signal CK output from the clock generator 138 by a 4-kHz overflow signal Ovf output from the counter 125. This 4-kHz overflow signal Ovf is a pulse which is generated by the counter 125 to enable transmission of the clock signal CK through the logic gate 137 upon the counter 125 entering an overflow condition, and resetting the ramp produced on its second output terminal.

It should be noted that a signal $S_{133}$ is at the output of the comparator 133, which generates the PWM output signal Output and generally contains spurious transitions that must be suppressed. The control system 162 of this invention includes, for this purpose, the output flip-flop 135, which is arranged to sample the signal $S_{133}$ at the output of the comparator 133 according to the 1-MHz clock signal CK by introducing an additional 1-µs delay that leaves the operation of the control system 162 unaffected.

Furthermore, flowing data from the counter 113 into the first register 129 at a 4-kHz rate has disadvantages due to the asynchronous nature of the respective clock signals generated by the VCO 115 and the clock generator 138, respectively, through the logic gate 137 (main oscillator at 1 MHz that is brought down to 4 kHz).

The control system 162 is therefore added the buffer register 128, which is normally updated at the same rate as the VCO 115. However, the updating is frozen a half clock time (500 ns) before transferring its contents into the first register 129, thereby ensuring data stability during the phase of transferring it from one register to the next.

Finally, it may be advisable for practical considerations to restrict the frequency of the VCO 115 to within a range of 100 kHz to 10 MHz, for example. For this purpose, the limiter 126 has been provided in the control system 162.

To summarize, the control system 162 of this invention allows a PWM output signal to be obtained with a transient response smooth that can be controlled by adjustment of the coefficients of integration/proportionality.

Figure 21:
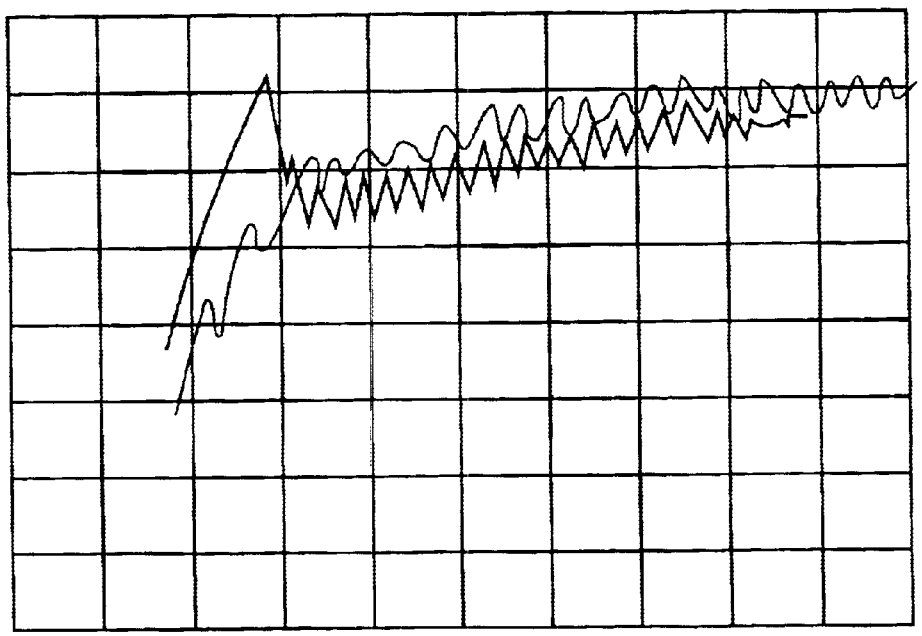
FIG. 21 shows experimental measurements taken on a system according to the invention.

FIG. 21 shows experimental measurements made on a system constructed of two different sets of coefficients that produce different degrees of transient response smoothing.

Although a specific embodiment of the invention has been disclosed, it will be understood by those having skill in the art that changes can be made to this specific embodiment without departing from the spirit and scope of the invention. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A proportional integral digital control circuit for controlling a pulse-width-modulated output signal through a load, the digital control circuit comprising:

an input terminal far receiving an analog error signal representing a difference between a controlled output current and a current set point for a load;

at least one analog-to-digital converter connected to the input terminal, the analog-to-digital adapted to perform an integration of an error atonal before an analog-to-digital conversion thereof, the analog-to-digital converter including:

a voltage controlled oscillator coupled to the input terminal, the voltage controlled oscillator including an output with a output signal therefrom representing in a digital signal form a least significant portion of the analog error signal:

a counter with a clock input coupled to the output of the voltage controlled oscillator and an output for representing in a digital signal form a most significant portion of the error signal; and an output terminal coupled to the output of the counter through at least one of an integrative and a proportional branch for providing a control output signal therefrom.

2. The digital control circuit according to claim 1, wherein a voltage controlled oscillator comprises:

at least one analog integrator block connected to the input terminal to perform the integration of the analog error signal.

3. The digital control circuit according to claim 2, wherein the analog-to-digital converter comprises:

at least one feedback loop including the analog integrator block and holding an output Signal from the analog integrator black within a predetermined operation range by means of suitable output comparators being connected to the analog integrator block.

4. The digital control circuit according to claim 3, wherein the analog-to-digital converter comprises:

at least one comparator and connected input of the counter.

5. The digital control circuit according to claim 4, wherein the control output signal through the integrative branch corresponds to an integral component only processed by a coefficient of multiplication.

6. The digital control circuit according to claim 5, wherein the control output signal through the proportional branch obtained by differentiating the integral component.

7. The digital control circuit according to claim 6, wherein a derivative component of the control output signal is obtained by further differentiating the proportional component.

8. The digital control circuit according to claim 7, wherein the least significant portion of the analog error signal, is discarded.

9. The digital control circuit according to claim 6, further comprising:

a periodically reset counter in the proportional control branch.

10. The digital control circuit according to claim 4, wherein the analog integrator block is connected to either of the followings:

the input signal; or the absolute value of the input signal when the input signal is negative;

wherein, according to the value taken by a routing logic signal internal of the feedback loop and applying the muting logic signal to a multiplexer;

wherein the multiplexer includes a first and a second input and an output, with the first input directly connected to the input terminal and the second input connected to the input terminal through an inverting buffer and the output of the multiplexer connected to the analog integrator block.

11. The digital control circuit according to claim 1, wherein the analog-to-digital converter includes one the voltage controlled oscillator connected to the input terminal through a rectifier.

12. The digital control circuit according to claim 11, characterized in that it further comprises a synchronization system for correctly transferring data between a counter operated at the same frequency as the voltage controlled oscillator and a following register operated at the same frequency as a main clock signal.

13. A proportional integral digital control circuit for controlling a purse-width-modulated output signal through a load, the digital control circuit comprising:

an input terminal for receiving an analog error signal representing a difference between a controlled output current and a current set point for a load;

at least one analog-to-digital converter connected to the input terminal the analog-to-digital converter including:

a voltage controlled oscillator coupled to the input terminal the voltage controlled oscillator including an output with a cutout signal therefrom representing in a digital signal form a least significant portion of the analog error signal;

a counter with a clock input coupled to the output of the voltage controlled oscillator and an output for representing in a digital signal form a most significant portion of the error signal;

at least one analog integrator block connected to the input terminal to perform the integration of the analog error signal;

at least one feedback loop including the analog integrator block and holding an output signal from the analog integrator block within a predetermined operation range by means of suitable output comparators being connected to the analog integrator block; and an output terminal coupled to the output of the counter through at least one of an integrative and a proportional branch for providing a control output signal therefrom;

wherein the analog-to-digital converter is an integration converter adapted to perform an integration of the analog error signal before an analog-to-digital conversion thereof.

14. The digital control circuit according to claim 13, wherein the analog-to-digital converter comprises:

at least one comparator and connected to the feedback loop.

15. The digital control circuit according to claim 14, wherein the control output signal through the integrative branch corresponds to an integral component which is only processed by a coefficient of multiplication.

16. The digital control circuit according to claim 15, wherein a proportional component of the control output signal is obtained by differentiating the integral component.

17. The digital control circuit according to claim 13, wherein the digital control circuit further comprises an output terminal providing a control output signal therefrom for controlling current through an inductive load.

18. The digital control circuit according to claim 17, wherein the digital control circuit further comprises an output terminal providing a control output signal therefrom for controlling current through an ABS type of brake control system.

* * * * *